April 20, 1954  P. BOITEUX  2,675,985
SHOCK-ABSORBING SUPPORT
Filed Aug. 4, 1949

INVENTOR
PIERRE BOITEUX
ATTORNEYS

Patented Apr. 20, 1954

2,675,985

UNITED STATES PATENT OFFICE 2,675,985

SHOCK ABSORBING SUPPORT

Pierre Boiteux, Laigle, France, assignor to Compagnie Generale d'Electricite, Paris, France, a corporation of France Application August 4, 1949, Serial No. 108,477

5 Claims. (Cl. 248—358)

The present invention relates to a supporting device for rollers, such as the rollers for paper manufacture, which must be guided by two supports arranged on both sides of the wire cloth carrying the paper pulp.

Various types of support are known, and these give satisfactory results in the case of rollers of light weight.

In order to utilise such rollers of large diameter as for carrying wire cloth which are required by the present-day technique of paper manufacture, precautions must be taken to avoid crushing, tearing and forming various other irregularities in the paper web. In particular, it has been recognized that the use of shock-absorbing means with the two supports makes it possible to improve the running of the rollers.

The known shock-absorbing means are of two types, namely spring-loaded devices, the resilience of which is fixed for a given load, or counterweight devices which can be regulated by displacement of the weight.

The first-mentioned type of device does not permit modification of the working conditions of the roller during a change of production.

The devices of the second type have the disadvantage of a considerable inertia, which in certain circumstances may give rise to vibrations.

The shock-absorbing support according to the present invention overcomes these disadvantages. It is essentially characterised by the use of a torsion bar, the operative length of which can be varied at will.

The shock-absorbing effect is thus obtained by the elasticity of a bar subjected to a torsional stress. As the angle of torsion produced by a given couple is a function of the length subjected to torsion, the sensitivity of the bar can be raised or lowered by varying its operative length.

The invention will be better understood by means of the following description with reference to the accompanying drawing, in which.

Figure 1:
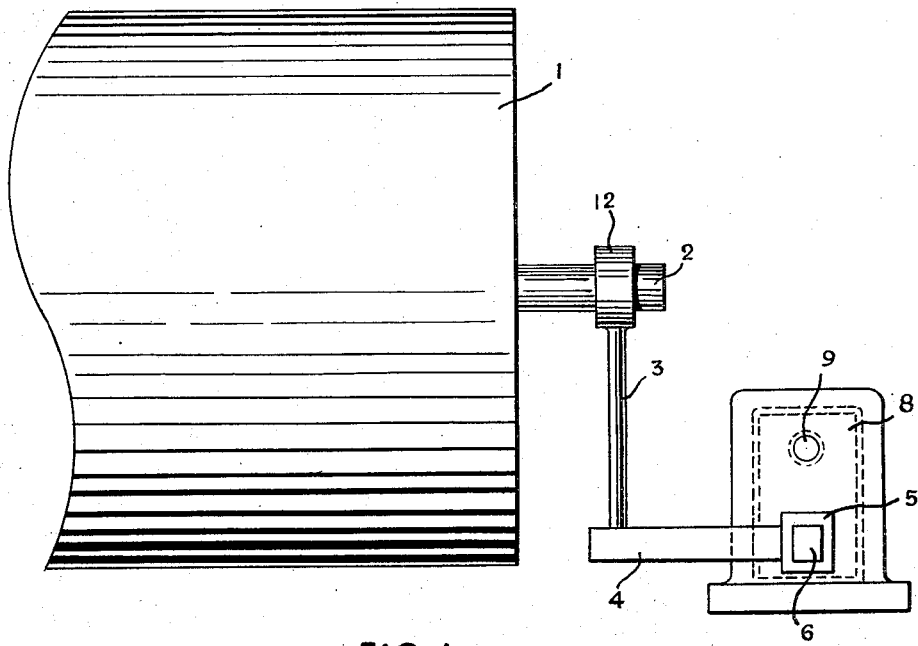
Figure 1 is a front view of one end of a roller, with a shock-absorbing support according to the present invention, given by way of example only.
Figure 2:
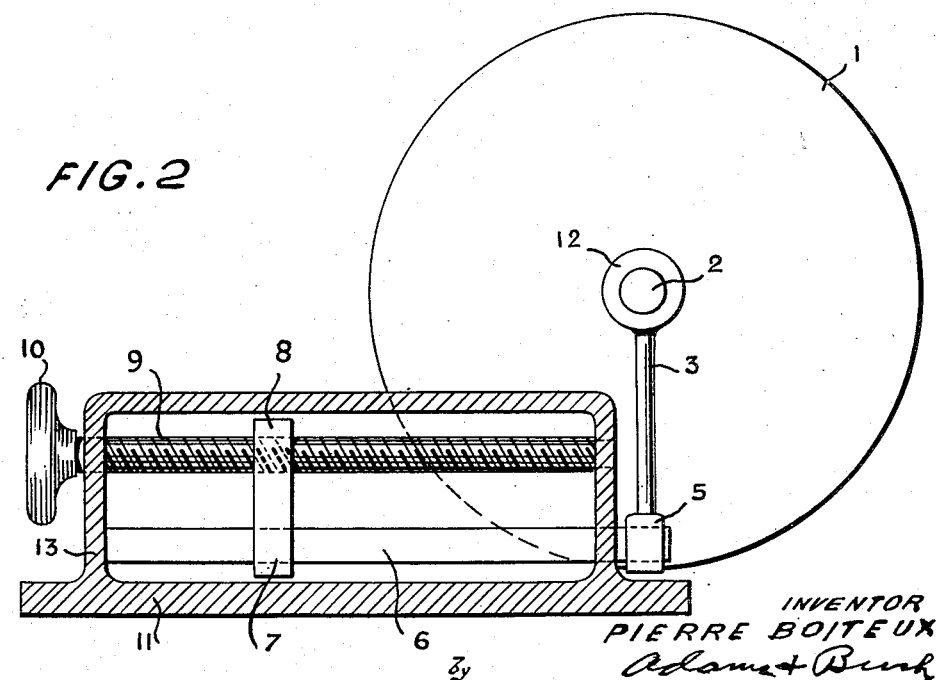
Figure 2 is an end view of the roller of Figure 1.

As shown, the shaft 2 of the roller 1 is supported at each end by a suitable bearing 12. The height of these bearings 12, 12, with relation to the layer of paper pulp, is determined by the suspension device arranged according to the present invention. Each one of the bearings 12, 12 rests on a lever arm 4 by means of a supporting member 3, which is shown schematically. The rod or lever arm 4 is fixed at its end by a stirrup 5 to the end of a torsion bar 6 of square cross-section, which rests on a frame 11 integral with the base of the machine, and which is fixed to this frame by its opposite end. The frame 11 has a lateral portion or arm or support means 13. The lever arm or rod 4, therefore, receives the load of the roller 1 and transmits it to the torsion bar 6 which is thus submitted to the action of a torsion couple, causing a proportional pivoting action of the lever arm or rod 4 around the axis of the torsion bar. The frame 11 and its arm 13, constitute mounting means for mounting the torsion bar 6. The stirrup 5, the rod 4, and the arm 3, constitute connecting means connecting the torsion bar to the support of the roller.

In order to vary at will the operative length of the torsion bar, a collar 7 fixed against rotation can be moved along the said bar over which it fits tightly to prevent rotation at the point where it is located. This collar carries at its upper end a nut 8 which engages with a screw-threaded rod or bolt 9 parallel to the bar 6. The rod or bolt 9 can be rotated by means of a hand-wheel 10. The bolt 9 is supported by lateral portion or arm 13 of frame 11.

When the hand-wheel 10 is turned in one direction or the other, the collar 7 moves along the bar 6. Whatever the position of the said collar 7, as the bar is carried thereby, the shock-absorbing action on the roller 1 will be ensured by the torsion of that part of the bar 6 which lies between the collar 7 and the stirrup-piece 5.

It is to be understood that various modifications of detail may be made in the embodiment described above, without departing from the essential feature of the invention.

I claim:

1. In a supporting mounting for a rotatable roller, a torsion bar of rectangular cross-section, a supporting stirrup fixedly mounted on one end of said torsion bar, means for applying to said stirrup a turning moment about the axis of said torsion bar, adjusting means having a rectangular aperture engaging said torsion bar and movable along the length of said torsion bar, and carrying means for supporting said torsion bar and for supporting said adjusting means slidably along the length of said bar in fixed relation to said carrying means as to rotation in a plane perpendicular to said torsion bar.

2. In a supporting mounting for a rotatable roller, a torsion bar of rectangular cross-section, a supporting stirrup fixedly mounted on one end of said torsion bar, means for applying to said stirrup a turning moment about the axis of said torsion bar, a collar having a rectangular aperture engaging said torsion bar and movable along the length of said torsion bar, and carrying means for supporting said torsion bar and for supporting said collar slidably along the length of said torsion bar in fixed relation to said carrying means as to rotation in a plane perpendicular to said torsion bar.

3. A supporting mounting according to claim 2, said collar having an extension forming a nut, and said carrying means comprising a screw-threaded bolt parallel to said torsion bar and which bolt engages said nut, so that rotation of said screw-threaded bolt moves said nut and said collar along said torsion bar to vary the effective length of said torsion bar.

4. In a supporting mounting for a rotatable roller, a shaft, a roller carried on said shaft, a bearing wherein said shaft is rotatably journaled, a main frame, a resilient torsion bar of rectangular cross section, support means fixedly carried by said frame whereon a first end of said torsion bar is fixedly mounted extending transversely of said shaft, a stirrup carried by the second end of said torsion bar, a rod carried by said stirrup and extending substantially parallel to said shaft, and an arm extending substantially vertically between said bearing and said rod for supporting said roller and its shaft on said rod and said bar, an adjustable riding collar mounted in sliding engaging relation on said bar and having a rectangular opening conforming to the cross-section of said bar, and adjusting means carried by said support means for adjusting the position of said collar along the length of said bar and for maintaining the position of said collar radially of said bar fixed with reference to said support means.

5. A mounting according to claim 4, said adjusting means including a nut comprised in said collar and a threaded bolt extending parallel to said bar and spaced radially therefrom and threadedly engaging said nut.

References Cited in the file of this patent

UNITED STATES PATENTS

| Number | Name | Date |
|---|---|---|
| 471,631 | Aldrich | Mar. 29, 1892 |
| 748,593 | Eck | Jan. 5, 1904 |
| 2,132,759 | Rabe | Oct. 11, 1938 |
| 2,372,764 | Clem et al. | Apr. 3, 1945 |
| 2,404,946 | Clem | July 30, 1946 |
| 2,606,758 | Collier | Aug. 12, 1952 |

FOREIGN PATENTS

| Number | Country | Date |
|---|---|---|
| 226,510 | Germany | Oct. 23, 1922 |
| 625,864 | Great Britain | July 5, 1949 |
| 888,459 | France | Dec. 14, 1943 |